United States Patent
Ramamurthy et al.

(10) Patent No.: US 10,567,463 B2
(45) Date of Patent: Feb. 18, 2020

(54) QUALITY TAGGING IN ADAPTIVE BITRATE TECHNOLOGIES

(71) Applicant: ARRIS Enterprises LLC, Suwanee, GA (US)

(72) Inventors: Shailesh Ramamurthy, Bengaluru (IN); Padmassri Chandrashekar, Bangalore (IN); Anil Kumar Nellore, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 178 days.

(21) Appl. No.: 15/648,944

(22) Filed: Jul. 13, 2017

(65) Prior Publication Data

US 2018/0020036 A1 Jan. 18, 2018

Related U.S. Application Data

(60) Provisional application No. 62/362,216, filed on Jul. 14, 2016.

(51) Int. Cl.
| | |
|---|---|
| *H04L 29/06* | (2006.01) |
| *H04N 21/2343* | (2011.01) |
| *H04N 21/234* | (2011.01) |
| *H04N 21/845* | (2011.01) |
| *H04N 21/2365* | (2011.01) |
| *H04L 29/08* | (2006.01) |

(52) U.S. Cl.
CPC ........ *H04L 65/607* (2013.01); *H04L 65/4092* (2013.01); *H04L 65/601* (2013.01); *H04L 65/80* (2013.01); *H04N 21/23418* (2013.01); *H04N 21/23439* (2013.01); *H04N 21/23655* (2013.01); *H04N 21/8456* (2013.01); *H04L 67/02* (2013.01); *H04L 67/42* (2013.01)

(58) Field of Classification Search
CPC . H04L 65/607; H04L 65/4092; H04L 65/601; H04L 65/80; H04L 67/02; H04L 67/42; H04N 21/23418; H04N 21/23439; H04N 21/23655; H04N 21/8456
USPC .......................................................... 709/219
See application file for complete search history.

(56) References Cited

U.S. PATENT DOCUMENTS

| | | | |
|---|---|---|---|
| 8,964,977 B2 * | 2/2015 | Ziskind .............. | H04N 21/4331 380/200 |
| 2013/0042015 A1* | 2/2013 | Begen ................. | B63B 15/0083 709/231 |
| 2013/0058480 A1 | 3/2013 | Ziskind et al. | |

(Continued)

FOREIGN PATENT DOCUMENTS

| | | | | |
|---|---|---|---|---|
| EP | 2360923 A1 * | 8/2011 | ..... | H04N 21/234327 |
| WO | 2013/043919 A1 | 3/2013 | | |

OTHER PUBLICATIONS

PCT International Search Report & Written Opinion, RE: Application No. PCT/US2017/041940, dated Nov. 2, 2017.

*Primary Examiner* — Glenford J Madamba
(74) *Attorney, Agent, or Firm* — Thomas A. Ward

(57) ABSTRACT

A method is provided for tagging a quality metric in adaptive bitrate (ABR) streaming, which allows a client to intelligently select a variant bitrate stream using the tagged quality metric. The method includes encoding multiple streams of video data at variant bitrates, each bitrate stream having a plurality of chunks, computing a quality metric for each chunk of each stream, and tagging the quality metric with each chunk of each stream.

14 Claims, 10 Drawing Sheets

(56) References Cited

U.S. PATENT DOCUMENTS

| | | | |
|---|---|---|---|
| 2013/0179589 A1* | 7/2013 | McCarthy | H04N 21/8456 709/231 |
| 2014/0019593 A1* | 1/2014 | Reznik | H04L 65/60 709/219 |
| 2016/0088054 A1* | 3/2016 | Hassan | H04L 65/80 709/219 |
| 2017/0295374 A1* | 10/2017 | Aaron | H04N 19/154 |

* cited by examiner

```xml
<?xml version="1.0"?>
<MPD xmlns="urn:mpeg:dash:schema:mpd:2011" profiles="urn:mpeg:dash:profile:full:2011" minBufferTime="PT1.5S">  <!-- 810A
<!-- Ad -->
<Period duration="PT30S">
    <BaseURL>ad/</BaseURL>
    <!-- Everything in one Adaptation Set -->
    <AdaptationSet mimeType="video/mp2t">
        <!-- 720p Representation at 3.2 Mbps -->
        <Representation id="720p" bandwidth="3200000" width="1280" height="720" AvgPSNR="35">  <!-- 810B
            <!-- Just use one segment, since the ad is only 30 seconds long -->
            <BaseURL>720p.ts</BaseURL>
            <SegmentBase>
                <RepresentationIndex sourceURL="720p.sidx"/>
            </SegmentBase>
        </Representation>
        <!-- 1080p Representation at 6.8 Mbps -->
        <Representation id="1080p" bandwidth="6800000" width="1920" height="1080" AvgPSNR="40">
            <BaseURL>1080p.ts</BaseURL>
            <SegmentBase>
                <RepresentationIndex sourceURL="1080p.sidx"/>
            </SegmentBase>
        </Representation>
    </AdaptationSet>
</Period>
<!-- Normal Content -->
<Period duration="PT5M">
    <BaseURL>main/</BaseURL>
    <!-- Just the Video -->
    <AdaptationSet mimeType="video/mp2t">
        <BaseURL>video/</BaseURL>
        <!-- 720p Representation at 3.2 Mbps -->
```

FIG. 8A

```xml
<Representation id="720p" bandwidth="3200000" width="1280" height="720">
  <BaseURL>720p/</BaseURL>
  <!-- First, we'll just list all of the segments -->
  <!-- Timescale is "ticks per second", so each segment is 1 minute long -->
  <SegmentList timescale="90000" duration="5400000">
    <RepresentationIndex sourceURL="representation-index.sidx"/>
    <SegmentURL media="segment-1.ts"/>
    <SegmentURL media="segment-2.ts"/>
    <SegmentURL media="segment-3.ts"/>
    <SegmentURL media="segment-4.ts"/>
    <SegmentURL media="segment-5.ts"/>
    <SegmentURL media="segment-6.ts"/>
    <SegmentURL media="segment-7.ts"/>
    <SegmentURL media="segment-8.ts"/>
    <SegmentURL media="segment-9.ts"/>
    <SegmentURL media="segment-10.ts"/>
  </SegmentList>
</Representation>
<!-- 1080p Representation at 6.8 Mbps -->
<Representation id="1080p" bandwidth="6800000" width="1920" height="1080">
  <BaseURL>1080/</BaseURL>
  <!-- Since all of our segments have similar names, this time we'll use a SegmentTemplate -->
  <SegmentTemplate media="segment-$Number$.ts" timescale="90000"/>
  <RepresentationIndex sourceURL="representation-index.sidx"/>
  <!-- Let's add a SegmentTimeline so the client can easily see how many segments there are -->
  <SegmentTimeline>
    <!-- This reads: Starting from time 0, there are 10 segments with a duration of
         (5400000 / @timescale) seconds -->
    <S t="0" r="10" d="5400000"/>
  </SegmentTimeline>
  </SegmentTemplate>
</Representation>
</AdaptationSet>
```

FIG. 8B

```
<!-- Just the audio -->
<AdaptationSet mimeType="audio/mp2t">
 <BaseURL>audio/</BaseURL>
 <!-- We're just going to offer one audio representation, since audio bandwidth isn't very
      important. -->
 <Representation id="audio" bandwidth="128000">
  <SegmentTemplate media="segment-$Number$.ts" timescale="90000">
   <RepresentationIndex sourceURL="representation-index.sidx"/>
   <SegmentTimeline>
    <S t="0" r="10" d="5400000"/>
   </SegmentTimeline>
  </SegmentTemplate>
 </Representation>
</AdaptationSet>
</Period>
</MPD>
```

FIG. 8C

QUALITY TAGGING IN ADAPTIVE BITRATE TECHNOLOGIES

CROSS REFERENCE TO RELATED APPLICATION

This Application claims priority under 35 U.S.C. § 119(e) from earlier filed U.S. Provisional Application Ser. No. 62/362,216, entitled "Quality Tagging in Adaptive Bitrate Technologies, e.g. HLS and DASH," filed on Jul. 14, 2016 and incorporated herein by reference in its entirety.

BACKGROUND

Technical Field

The present invention relates generally to adaptive bitrate streaming, and more specifically to tagging a quality metric to adaptive bitrate streams.

Related Art

Adaptive bitrate (ABR) or multiple bitrate (MBR) transcoding is used for delivering video over Internet protocol (IP) networks using HTTP as transport. Typically, in ABR transcoding, a single input stream (e.g., video stream) is ingested by a transcoding device, and the ingested video is transcoded into multiple output streams, each at different resolutions, or bitrates, or both.

In ABR, small segments or chunks of approximately 2-10 seconds each are typically used, to deliver video and audio media. To deal with network fluctuations, the client can switch at chunk boundaries between different bitrate versions encoded of the same content, based on the receiver bandwidth available. The receiver bandwidth may be estimated by the client in HLS and MPEG DASH.

HLS or DASH adaptive bitrate streams advertise, in their variant streams, the bitrate associated with the variant stream. Currently there is no notion of what quality is associated with each variant stream. There could be cases where, even though the instantaneous receiver bandwidth as seen by a client is high, there is no need to go for the highest possible bitrate variant since the gains in quality are not commensurate and in fact, there could be negative effects when seen in a group of clients scenario (oscillatory behavior) or, even within a single client, annoying switching artifacts potentially later in time.

SUMMARY

Embodiments of the present disclosure provide methods and systems for tagging a quality metric in adaptive bitrate streaming, which allows a client to intelligently select a variant bitrate stream using said quality metric.

Embodiments of the present disclosure provide a method of providing a quality metric to adaptive bitrate streaming. The method includes encoding multiple streams of video data at variant bitrates, each bitrate stream having a plurality of chunks; computing a quality metric for each chunk of each stream; and tagging the quality metric with each chunk of each stream.

In another embodiment, an adaptive bitrate streaming system is disclosed. The system includes an encoder device configured to encode multiple streams of video data at variant bitrates, each bitrate stream having a plurality of chunks; and a content creation server configured to compute a quality metric for each chunk of each stream and tag the quality metric with each chunk of each stream.

In another embodiment, a machine readable medium containing processor instructions is disclosed. Execution of the instructions by a processor causes the processor to perform a process including computing a quality metric for each chunk in each variant bitrate stream; tagging the quality metric with each chunk of each variant bitrate stream; and providing the quality metric to a client device for selection of each chunk.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

FIGS. 8A-8C show a functional block diagram illustrating an example average PSNR being encapsulated into a variant in a manner used by MPEG DASH in accordance with an embodiment of the disclosure.

DETAILED DESCRIPTION

Figure 1:
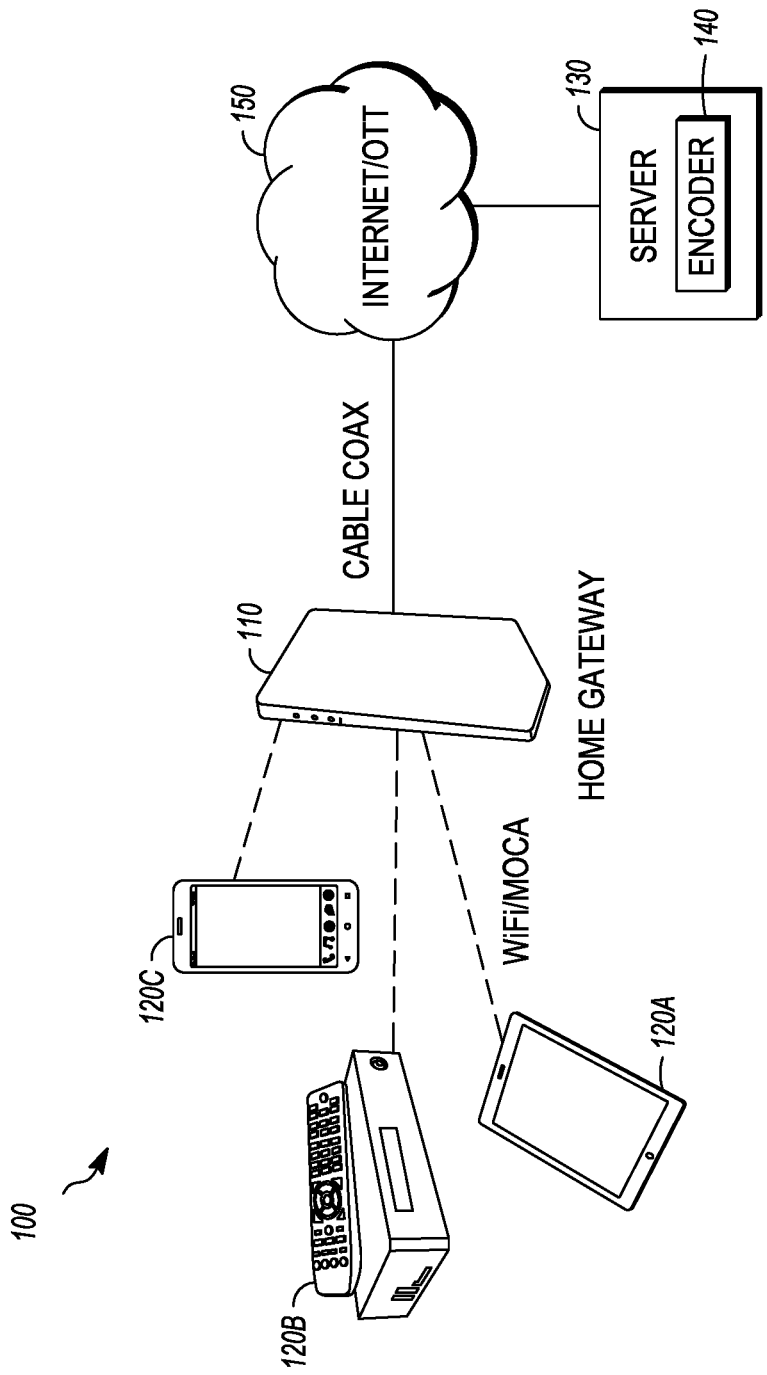
FIG. 1 is a block diagram illustrating an example home network environment operable to transcode an input stream into one or more output streams in accordance with an embodiment of the disclosure.

In the past few decades, advances in the related fields of video compression and video transmission systems have led to the widespread availability of digital video programs transmitted over a variety of communication systems and networks. Most recently, new technologies have been developed that have allowed television programs to be transmitted as multicast, e.g., IP multicast, digital bit streams of multiplexed video and audio signals delivered to users or client subscribers over packet switched networks.

ABR streaming is a technology that works by breaking the overall media stream into a sequence of small HTTP-based file downloads (e.g., segments or chunks), each download loading one short segment of an overall potentially unbounded transport stream. As the stream is played, the client (e.g., the media player) may select from a number of different alternate streams (e.g., variants) containing the same material encoded at a variety of data rates, allowing the streaming session to adapt to the available data rate. At the start of the streaming session, the player downloads/receives a manifest containing the metadata for the various substreams which are available. ABR streaming methods have been implemented in proprietary formats including HTTP Live Streaming (HLS) by Apple, Inc. and HTTP Smooth Streaming by Microsoft. Inc.

As provided above, there is currently no notion of what quality is associated with each variant bitstream. This matters in cases such as when there is oscillatroy behavior across clients or when the highest bitrate is not required for the best user experience.

For example, in oscillatory behavior across clients, in unmanaged networks, often video client receivers deal with network vagaries to the extent that they oscillate between low and high bitrate variant streams continually. Equitability is a potential issue depending on even the timing of when each client starts. Additionally, in deployed scenarios, some suboptimal behaviors have been observed even in seemingly stable consumption patterns. ☐☐In one scenario, clients consuming standard definition (SD) resolution converged to using higher bitrates variants than some clients consuming high definition (HD) resolution. ☐☐In another scenario, low complexity talking-head style sequences converged to higher bitrate variants than those used by high complexity sports sequences. ☐It is generally understood that the highest bitrate is not required for best user experience or quality in such scenarios.

Additionally, in some cases, when a client switches bitrate variants results in undesirable user experience. For example, clients that switch between maximum and minimum bitrate variants may be a pointed case. In such cases, when the same content was consumed at a lower bitrate variant version, the user experience was felt to be better. As an example, bitrate variants with peak signal to noise ratio (PSNR) of 35 dB or below or a structural similarity (SSIM) of 0.85 or below, are associated with subjective video quality that is generally unacceptable to a common viewer. However, PSNR of more than 40 dB yields diminishing returns. Having a PSNR above 45 dB or a SSIM of above 0.99, often yields video quality differences that are not perceptible to a viewer. Therefore, bitrate variants that result in extremely high PSNRs (when PSNR is actually measured) do not bring in advantage in video quality, but are characterized by large bitrates. The large number of bits expended in such cases could have been better utilized in ensuring equitability across clients.

Thus, a method and/or system that determines or computes a quality metric associated with each bitrate variant is highly desirable. In some embodiments, a content creation server, or an intermediate gateway or network element, may tag the PSNR of each variant bitrate stream, or any other quality metric (e.g., structural similarity (SSIM), mean square error (MSE), mean sum of absolute differences (MSAD), etc.).

FIG. 1 is a block diagram illustrating an example home network environment 100 operable to transcode an input stream into one or more output streams. In embodiments, video content can be delivered to customer premise equipment (CPE) device or home gateway 110 from a server(s) 130 (e.g., ABR server or content creation server). In some embodiments, video content can be transcoded at server 130. For example, an encoder 140 can receive an input video stream and transcode the input video stream at various bitrates, resolutions and frame rates. In some embodiments, the server 130 can be a cable headend (e.g., cable modem termination system (CMTS)), digital subscriber line access multiplexer (DSLAM), mobile cellular base station, wireless access point or optical line terminal (OLT).

In some embodiments, server 130 can deliver video content to home gateway 110 through a network such as the internet or over the top content (OTT) 150. In some embodiments, the internet or OTT 150 can be a DOCSIS based Hybrid-Fiber Coax (HFC) network, digital subscriber loop (DSL), mobile cellular network (e.g., 3G, 4G, LTE, etc.), wireless network (e.g., 802.11, 802.16, etc.), fiber to the curb (FTTC), fiber to the premise (FTTP) network, or other broadband access network. In some embodiments, home gateway 110 can be, for example, a cable modem or embedded media terminal adapter, a set-top box, a wireless router including an embedded cable modem, or simply a gateway. It should be understood that home gateway 110 can also include a digital subscriber line (DSL) modem, a voice over internet protocol (VOIP) terminal adapter, a video game console, a digital versatile disc (DVD) player, a communications device, an optical network unit (ONS), or the like. Home gateway 110 can also include a local interface that can forward IP video streams to one or more external devices. For example, the local interface can be based on the Multimedia over Coax Alliance (MoCA), 802.11, Ethernet, universal serial bus (USB), G.hn specifications, or other home networking specifications.

By way of example, FIG. 1 depicts a home gateway 110 facilitating communications from the internet or OTT 150 to a first mobile device (e.g. tablet device) 120a, a set-top box 120b, and a second mobile device (e.g., mobile phone) 120c. While not explicitly shown, the set-top box 120b may facilitate communications from the internet or OTT 150 to a television or a digital video recorder (DVR). While two mobile devices 120a and 120c are shown in communication with home gateway 110, other devices such as computers and televisions may alternatively be used. In some embodiments, a home gateway 110 may include an encoder which can be operable to ingest an input video stream and output the input video stream as one or more output video streams at various bitrates, resolutions and/or frame rates.

In such a home network environment 100, if the clients choose the variant in accordance to the quality metric tagged into stream, overall user experience of users across the this network is improved.

Figure 2:
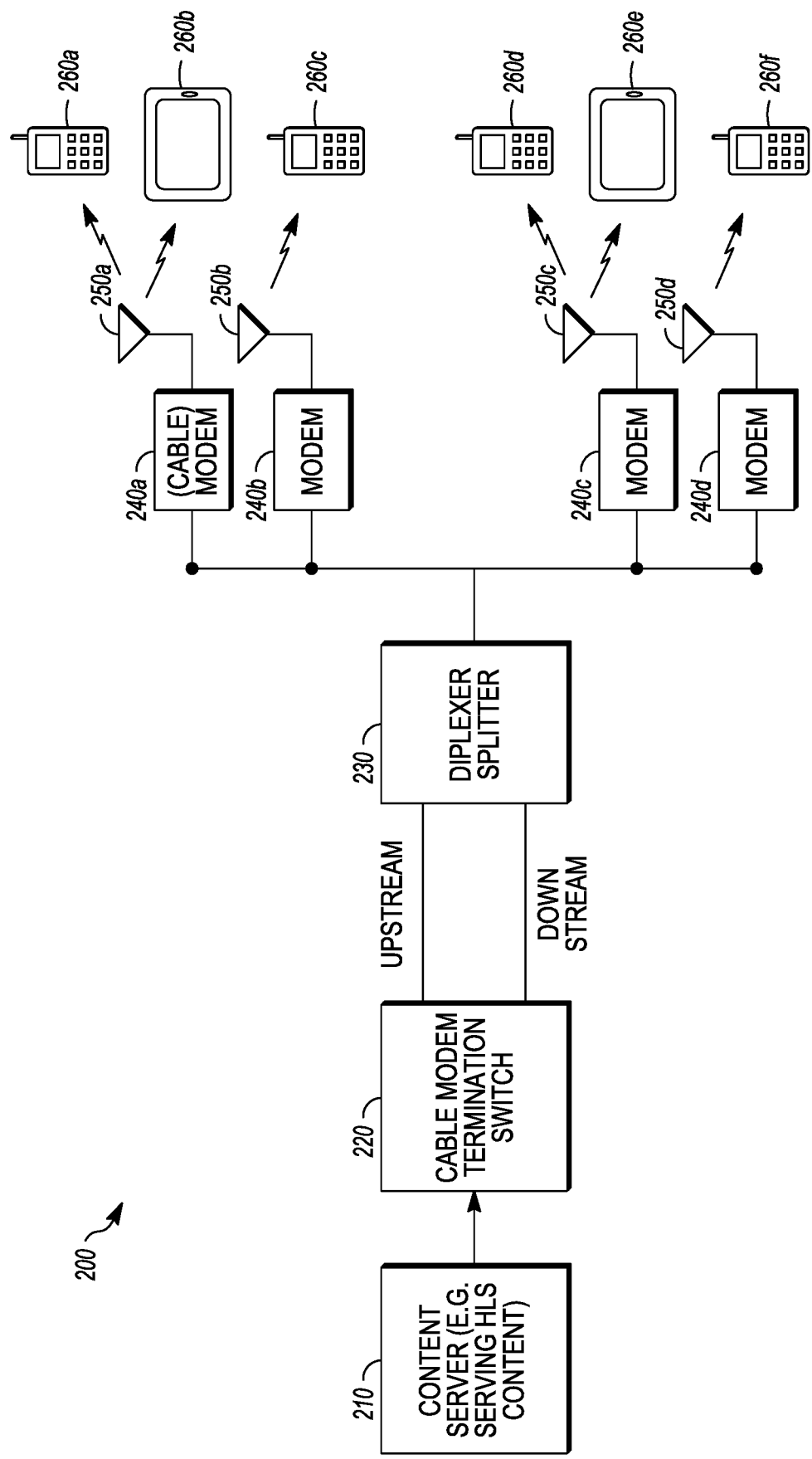
FIG. 2 is a block diagram illustrating an example managed network environment operable to transcode an input stream into one or more output streams in accordance with an embodiment of the disclosure.

FIG. 2 is a block diagram illustrating an example managed network environment 200 operable to transcode an input stream into one or more output streams. The managed network 200 includes a content server 210, a Cable Modem Termination Switch 220, an optional diplexer or splitter 230, a plurality of cable modems 240a, 240b, 240c, 240d with a plurality of WiFi 250a, 250b, 250c, 250d and a plurality of mobile clients 260a, 260b, 260c, 260d. In some embodiments, content server 210 provides HLS content including multiple HLS streams. In some embodiments, the Cable Modem Termination Switch 220 is configured to feed digital signals into the cable modems 240a, 240b, 240c, 240d. In some embodiments, the diplexer 230 is used to multiplex upstream and downstream. The resulting stream may be fed to an array of cable modems via a splitter. In some embodiments, the plurality of mobile clients 260a, 260b, 260c, 260d are ipads or mobile phones or other tablets. The cable modems 240a, 240b, 240c, 240d be dual-band 802.11n which are WiFi capable (e.g., 5 or 2.4 GHz).

In such a managed network environment 200, if the clients choose the variant in accordance to the quality metric tagged into stream, the overall user experience of users across this network is improved.

Figure 3:
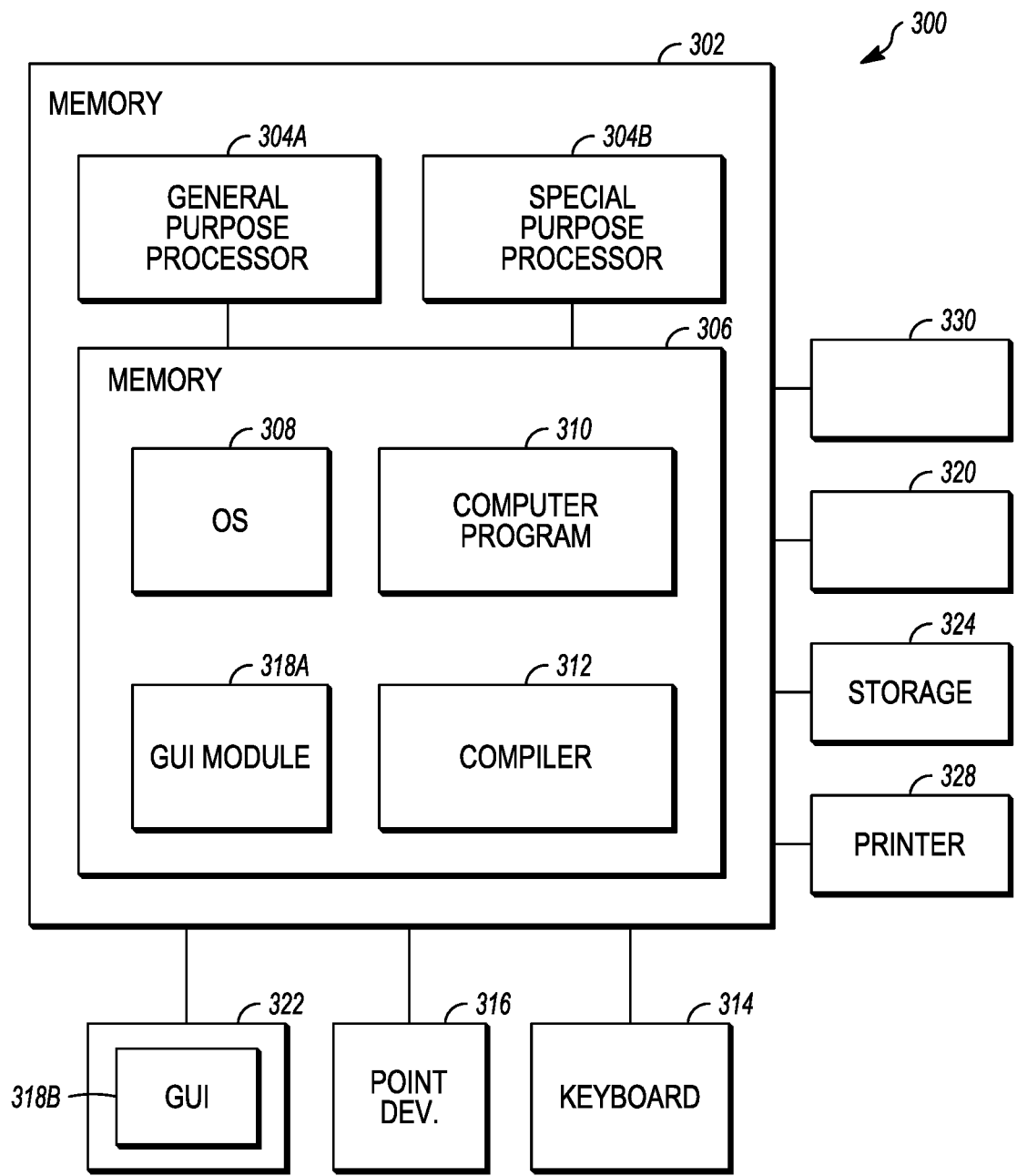
FIG. 3 is a diagram illustrating an example computing device that could be used to implement elements in accordance with an embodiment of the disclosure.

FIG. 3 is a diagram illustrating an exemplary computer system 300 that could be used to implement elements of the present invention, including the ABR server 302, client 304, and elements thereof. The computer 302 comprises a general purpose hardware processor 304A and/or a special purpose hardware processor 304B (hereinafter alternatively collectively referred to as processor 304) and a memory 306, such as random access memory (RAM). The computer 302 may be coupled to other devices, including input/output (I/O) devices such as a keyboard 314, a mouse device 316 and a printer 328.

In one embodiment, the computer 302 operates by the general purpose processor 304A performing instructions defined by the computer program 310 under control of an operating system 308. The computer program 310 and/or the operating system 308 may be stored in the memory 306 and may interface with the user and/or other devices to accept input and commands and, based on such input and commands and the instructions defined by the computer program 310 and operating system 308 to provide output and results.

Output/results may be presented on the display 322 or provided to another device for presentation or further processing or action. In one embodiment, the display 322 comprises a liquid crystal display (LCD) having a plurality of separately addressable pixels formed by liquid crystals. Each pixel of the display 322 changes to an opaque or translucent state to form a part of the image on the display in response to the data or information generated by the processor 304 from the application of the instructions of the computer program 310 and/or operating system 308 to the input and commands. Other display 322 types also include picture elements that change state in order to create the image presented on the display 322. The image may be provided through a graphical user interface (GUI) module 318A. Although the GUI module 318A is depicted as a separate module, the instructions performing the GUI functions can be resident or distributed in the operating system 308, the computer program 310, or implemented with special purpose memory and processors.

Some or all of the operations performed by the computer 302 according to the computer program 310 instructions may be implemented in a special purpose processor 304B. In this embodiment, some or all of the computer program 310 instructions may be implemented via firmware instructions stored in a read only memory (ROM), a programmable read only memory (PROM) or flash memory within the special purpose processor 304B or in memory 306. The special purpose processor 304B may also be hardwired through circuit design to perform some or all of the operations to implement the present invention. Further, the special purpose processor 304B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 302 may also implement a compiler 312 which allows an application program 310 written in a programming language such as COBOL, C, C++, FORTRAN, or other language to be translated into processor 304 readable code. After completion, the application or computer program 310 accesses and manipulates data accepted from I/O devices and stored in the memory 306 of the computer 302 using the relationships and logic that was generated using the compiler 312.

The computer 302 also optionally comprises an external communication device such as a modem, satellite link, Ethernet card, or other device for accepting input from and providing output to other computers.

In one embodiment, instructions implementing the operating system 308, the computer program 310, and/or the compiler 312 are tangibly embodied in a computer-readable medium, e.g., data storage device 320, which could include one or more fixed or removable data storage devices, such as a zip drive, floppy disc drive 324, hard drive, CD-ROM drive, tape drive, or a flash drive. Further, the operating system 308 and the computer program 310 are comprised of computer program instructions which, when accessed, read and executed by the computer 302, causes the computer 302 to perform the steps necessary to implement and/or use the present invention or load the program of instructions memory, thus creating a special purpose data structure causing the computer to operate as a specially programmed computer executing the method steps described herein. Computer program 310 and/or operating instructions may also be tangibly embodied in memory 306 and/or data communications devices 330, thereby making a computer program product or article of manufacture according to the disclosure. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 302. Although the term "computer" is referred to herein, it is understood that the computer may de portable devices such as cellphones, portable MP3 players, video game consoles, notebook computers, pocket computers, or any other device with suitable processing, communication, and input/output capability.

Figure 4:
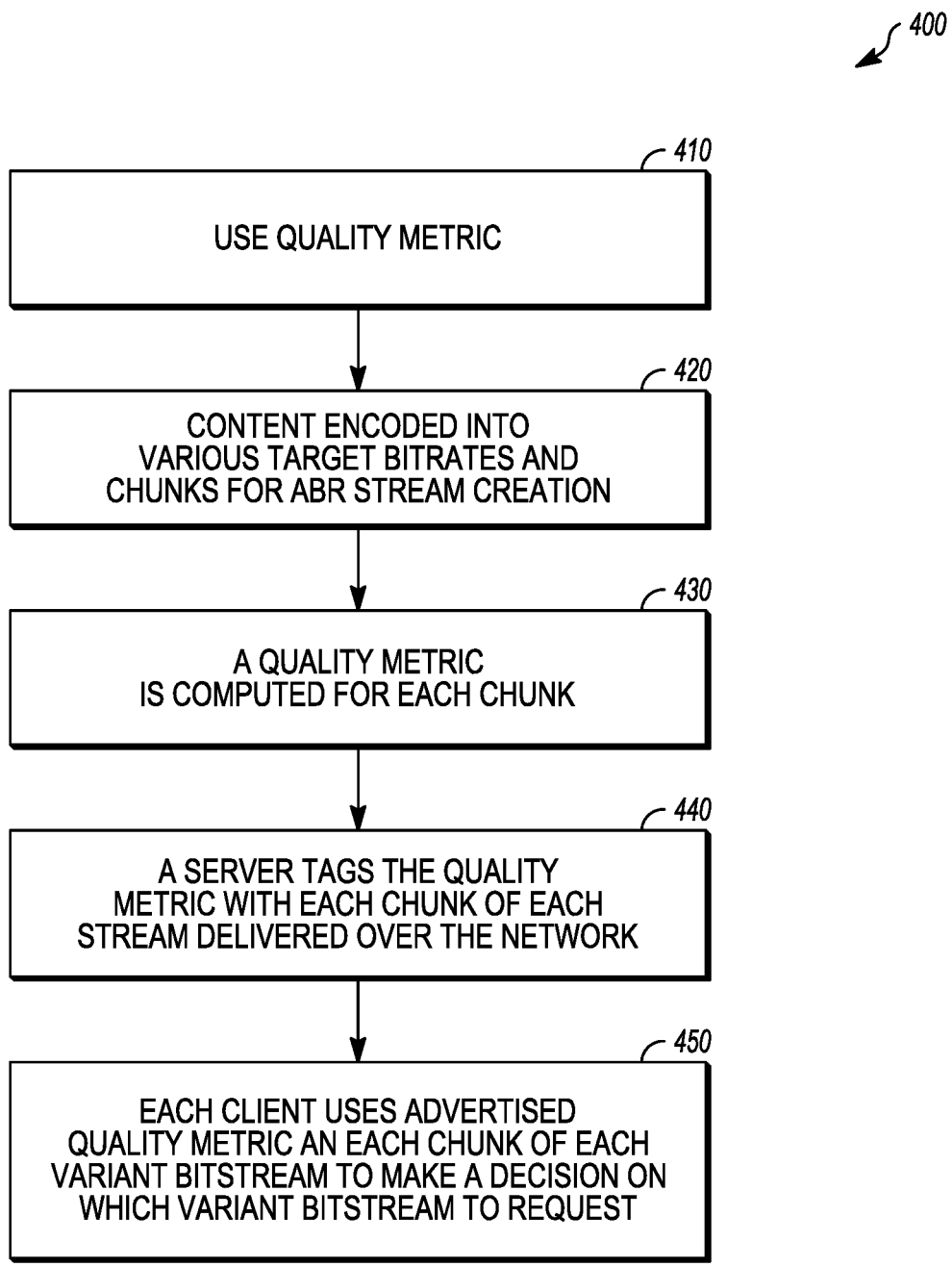
FIG. 4 is a flowchart illustrating an example process for using a quality metric in ABR streaming in accordance with an embodiment of the disclosure.

FIG. 4 is a flowchart illustrating an example process 400 for using a quality metric in ABR streaming. Process 400 is initiated at step 410, where it is determined that a quality metric will be used. At step 410, content is encoded into various target titrates and chunks for ABR stream creation. For example, the target bitrates may be predetermined, such as 512 kbps, 1 Mbps, 2 Mbps, 4 Mbps, etc. The chunk duration may similarly be predetermined (e.g. approximately 2-10 seconds each).

At step 430, a quality metic is computed for each chunk. In some embodiments, the quality metric is determined for each frame of each chunk. As provided above, a number of different computations may be used for the quality metric, including but not limited to PSNR, SSIM, MSE, and MSAD.

PSNR is one of the most frequently used metrics for objective video quality measurement. PSNR is calculated by the means of the mean squared error (MSE), which describes how different two signals are. For a video, MSE is calculated by looping over all frames in the reference and test videos.

In case of an encoder, the reference video is the uncompressed video. The tested video is the video reconstructed or decoded from the encoded video. The quality metric can also be computed after encoding, at e.g., a media aware network element (MANE). At a MANE, if uncompressed video is not available, the video frames of the highest bitrate variant form the reference video, and the video of the current variant for which PSNR is being computed forms the test video.

The PSNR is calculated as follows. According to Equation (1), the mean square error between the test video and the reference video provides the compression noise (distortion) present, calculated over each pixel of the video of each frame in the sequence. The MSE can be calculated over each chunk of each variant bitrate. In Equation (2), the maximum luminance value is 255, and hence PSNR is calculated by taking the ratio of square of 255 (the peak signal) and MSE (the noise). This is converted into dB by taking log of PSNR and multiplying it by 10. This measures the compression noise and hence correlates to visual quality; in general, higher the PSNR, lower is the compression noise and better is the visual quality.

$$MSE(r, t) = \frac{1}{N}\sum_{n=1}^{N}(r_i - t_i)^2 \qquad \text{Equation (1)}$$

$$PSNR = 10\log\frac{255^2}{MSE} \qquad \text{Equation (2)}$$

In some embodiments, if uncompressed video is available, it forms the reference video, and the video of the current variant for which PSNR is being computed forms the test video. In some embodiments, if uncompressed video is not available, the video frames of the highest bitrate variant form the reference video, and the video of the current variant for which PSNR is being computed forms the test video.

At step 440, a server tags the quality metric with each chunk of each stream delivered over the network. In some embodiments, the process of tagging involves the process of insertion of syntax element containing the quality metric, into the stream such that the client devices can have understanding of this quality metric. At step 450, each client may use the advertised quality metric in each chunk of each variant bitstream to make a decision on which variant bitstream to request.

As provided above, the tagging may help in the following way: since bitrate variants that result in extremely high PSNRs do not bring in advantage in video quality, but are characterized by large bitrates, the large number of bits expended in such cases can be better utilized in ensuring equitability across clients. For example, a client can choose 1 Mbps bitrate variant rather than 2 Mbps bitrate variant if the 1 Mbps bitrate variant is itself associated with 45 dB.

Alternatively, a client can learn about the optimal quality (PSNR) for its user:
  e.g., a higher PSNR for a large display,
  e.g., a lower PSNR for a smaller display,
  Some users may want high quality on a per-chunk basis, while others may want □to reduce differences in quality during potential switching (e.g., "continuity of PSNR between chunks"). These user preferences can be learned by the client. In one embodiment, the user can be given an option of rating each video as and when seen by the user, while in another embodiment, a user can choose among options such as "choose highest possible quality for each chunk" vs "choose minimum differences in quality caused during chunk switching."
  A home gateway that serves a group of clients (e.g., 4 mobile clients) can log historical data on the switching pattern between clients and can guide each client to switch in a manner that provides equitability across clients.
  Generalizing the above—even if a home gateway is not necessarily present—if multiple clients agree on a policy that ensures minimum acceptable viewing quality (rather than a greedy approach that best fits their receiver bandwidth), the equitability problem cited above would also be alleviated to a great extent.

In some embodiments, the quality metric tagging can be done during encoding and chunking, or post-encoding-chunking (e.g., in an offline pre-processing step before content is deemed ready for delivery to clients).

Typically, a PSNR computation requires the reconstructed video to be compared with the uncompressed video input to an encoder. However, if the tagging is done when an encoder operates on uncompressed-video, PSNR using the uncompressed video as baseline is feasible.

In the case of pre-encoded adaptive bitrate streams without access to the original uncompressed video (e.g., at a network element or server), relative PSNRs can be measured with respect to the content corresponding to the highest bitrate variant, so that the notion of differential and relative PSNRs can be embedded into the streams.

In some embodiments, the encoder and/or chunker tag the quality metric on a per chunk basis. In some embodiments, each bitrate variant may be associated with one quality metric (across chunks). For example, in quality metric tagging per chunk, chunk 2 of 512 kbps variant has 39 db, chunk 3 of 512 kbps variant has 40 db. Alternatively, in quality metric tagging once per variant stream, the 512 kbps variant has average of 35 db.

In some embodiments, quality metric tagging also helps establish a quality baseline given that different encoders may encode to a same target bitrate but result in different qualities.

In some embodiments, a client (or group of clients) makes a choice based on one or more of the following parameters—PSNR advertised, bitrate variant advertised, receiver bandwidth available, number of clients contending for bandwidth, user preferences, and quality desired at a target resolution at a client. An example is provided below in the discussion of FIG. 7.

As an example, consider a client consuming 4 chunks of video content A. Assume that the first two chunks have video of high complexity (like a sports sequence) and the next two have a newsreader. Consider that the client has receiver bandwidth for 4 Mbps. Consider that the client needs at least 40 db for acceptable viewing quality. Consider two variants of this content, V1 of 2 Mbps and V2 of 3 Mbps.
  Chunks 1, 2, 3, 4 of V1 have a quality metric of 30, 35, 43, 45 db.
  Chunks 1, 2, 3, 4 of V2 have a quality metric of 42, 42, 48, 48 db.
  In a non-greedy approach envisioned in this disclosure, the client chooses variant V2 for chunks 1 and 2. It then chooses variant V1 for chunks 3 and 4.

Figure 5:
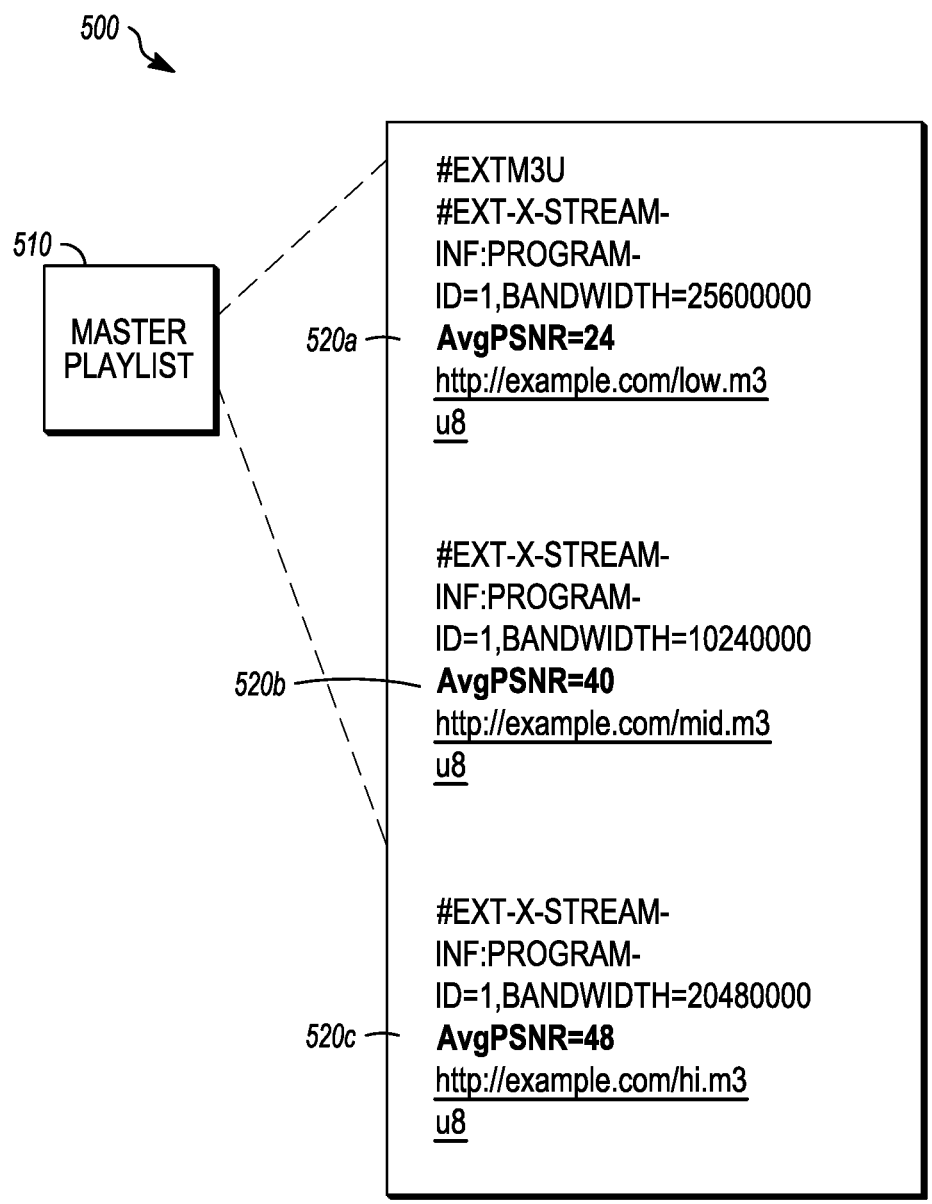
FIG. 5 is a functional block diagram illustrating an example media playlist in HLS having a quality metric field in accordance with an embodiment of the disclosure.

In order for the client to be able to select an appropriate variant bitstream, the quality metric must be made available to it or advertised. FIG. 5 is a functional block diagram 500 illustrating an example media playlist in HLS having a quality metric field. As shown, a media playlist such as a master playlist 510 is shown expanded form having three bitstream variants, with each having a quality metric tag 520*a*, 520*b*, 520*c* labeled as AvgPSNR.

Once the quality metric is provided/advertised to the client, it can then determine which variant to select. For example, the quality metric tag 520*a* may be too low quality for a client with an AvgPSNR=24 and the quality metric tag 520*c* may be too high quality (e.g., wasteful or diminishing returns) for a client with an AvgPSNR=48. Thus, a client may select quality metric tag 520*b* having an AvgPSNR=40 because it will produce a high enough quality video without taking up excessive bitrates.

Figure 6:
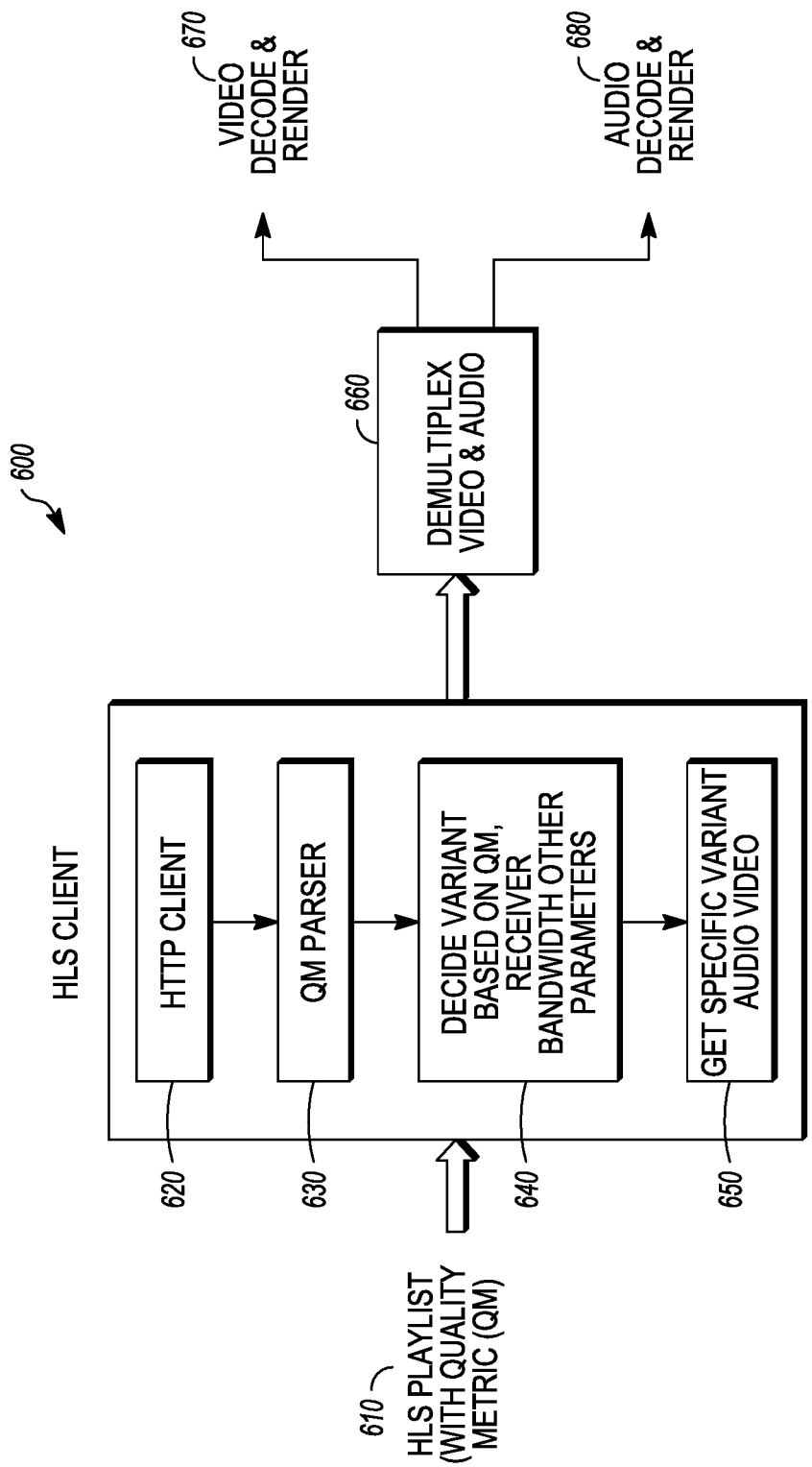
FIG. 6 is a flowchart illustrating an example process for client device parsing a quality metric field in accordance with an embodiment of the disclosure.

In order for a client to determine the advertised quality metric for each bitrate variant, it must be able to read or parse the quality metric field. FIG. 6 is a flowchart illustrating an example process 600 for client device parsing a quality metric field. In a first step 610, an HLS client receives an HLS playlist with the quality metric (QM) embedded within the playlist, over HTTP at step 620. The HLS client parses the QM at step 630 to get information of quality associated with each of the variants. At step 640, the HLS client decides which variant to request, based on QM and receiver bandwidth available, along with other optional parameters like its own display resolution. Upon making this decision, at step 650 the HLS client then requests and gets the specific audio-video transport stream associated with the chosen variant at step 660. The video is decoded and rendered over the video path of the client at step 670. The audio is decoded and rendered over the audio path of the client at step 680.

Figure 7:
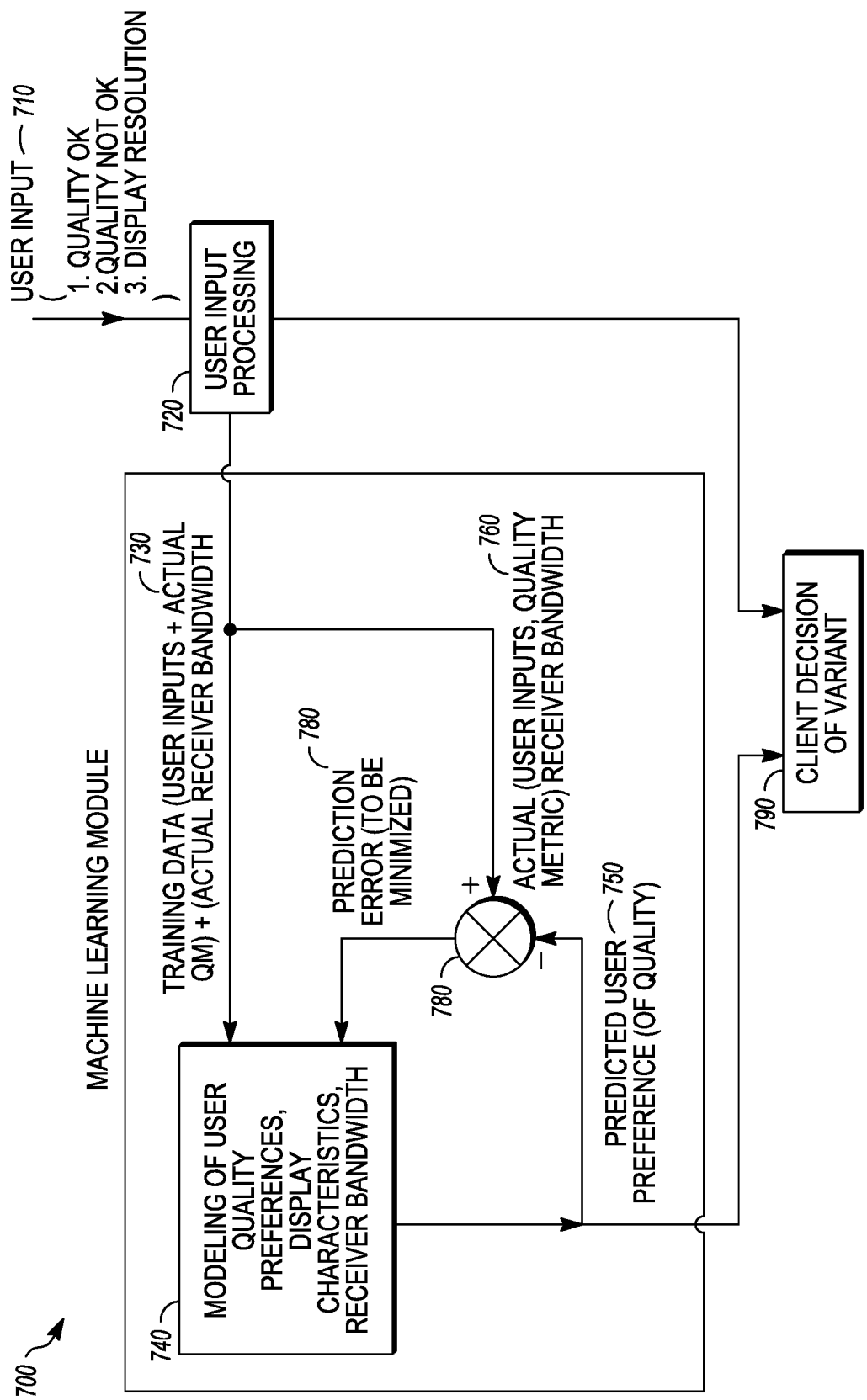
FIG. 7 is a flowchart illustrating an example process of how a client or user m decision based on the QM, receiver bandwidth, and display characteristics in accordance with an embodiment of the disclosure.

FIG. 7 provides an example process 700 of how a client or user makes a decision based on the QM, receiver bandwidth, and display characteristics. In a first step, the client 710 provides inputs pertaining to the quality feedback from the user. In some embodiments, the quality feedback as a function of user preferences and his/her display characteristics and instantaneous receiver bandwidth can be learnt over time, to make for better client decisions of the choice of the variant. These inputs (e.g., Quality OK/Not-OK, Display used) are processed by "User Input Processing" Module at step 720. These inputs may be augmented with the actuals of Quality metric and the receiver bandwidth at step 730, in order to yield training data for an e.g., machine learning module. A machine learning module can use state of art techniques such as support vector machines, neural networks, statistical classifiers, genetic algorithms etc. At step 740, a machine learning module models the user preferences over time, using e.g., said training data. The predictions of the user preferences (step 750), and the actuals of user inputs (step 760), receiver bandwidth and quality metric, are compared (step 770) during the learning phase, such that the error of the difference between said predictions and the actual user inputs is minimized as the learning proceeds (step 780). When it is deemed that the said error is below a threshold, the predictions from the machine learning module are used by the client to make decision on which variant to request at step 790.

In another embodiment, there can be an initial calibration phase where the user views various contents at various levels of a quality metric on his device. The user can provide feedback on whether the video quality is acceptable or not, in his device.

While described thusfar as using received chunks for streaming video, the present disclosure also supports a download use-case. For example, the present systems and methods can enable intelligent downloads. As can be appreciated, a naïve download case is to download the chunks as they are streamed, which would be belong to different bitrate versions. On the other end of the spectrum, the best bitrate versions of all chunks can be used for download.

In accordance with the present disclosure, the tagged quality metric can be intelligently used by a client downloading the chunks. This need not be one of the two naïve cases described above. Instead, the client can decide that the versions of chunks that satisfy a quality metric>=a chosen quality threshold (e.g., quality criteria of PSNR>=45 db), can be used for intelligent download. In this way, a sweet-spot between the download bandwidth (and hence the over-all network bandwidth in a group-of-clients scenario) and the quality of video can be achieved. Of course, in case where the chosen versions of the chunks for download are the same (in case of some chunks) as the chunks a client chooses for streaming, the streamed chunks can be reused. It should be noted that the streamed chunks have to satisfy the instantaneous bandwidth criteria while downloads can take place offline and hence slower than realtime in case of a slow network.

Additionally, while FIG. 5 is a functional block diagram illustrating an example media playlist in HLS having a quality metric, the quality metric can also be incorporated into adaptive bitrate deliveries using MPEG DASH. FIGS. 8A-8C provide a functional block diagram 800 illustrating an example average PSNR being encapsulated into a variant in a manner used by MPEG DASH by means of use of a new field 'AvgPSNR' shown as 810*a* and 810*b*.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that in embodiments the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In embodiments, multitasking and parallel processing may be advantageous.

We claim:

1. A method of providing a quality metric to adaptive bitrate video streaming, comprising:
   encoding multiple streams of video data at variant bitrates, each bitrate stream having a plurality of chunks;
   computing a quality metric for each chunk of each stream, wherein the quality metric is used in combination with at least one of the following parameters to select the variant bitrate:
   receiver bandwidth available to a client, display characteristics used by a client, and user feedback on quality at a client, and wherein the quality metric and said at least one of the following parameters are used by a machine learning module to select the variant bitrate; and tagging the quality metric with each chunk of each stream, wherein the tagging of the quality metric of each chunk is provided in a syntax list, wherein the tagging of the quality metric is performed via content creation server based on user preferences learned from a client, and wherein the tagging of the quality metric is performed via an encoder and re-encoding is not applied; and selecting a variant bitrate based in part on the quality metric of the chunks in the stream.

2. The method of claim 1, wherein the selecting the variant bitrate is further based on the bandwidth available to a client.

3. The method of claim 1, wherein the tagging the quality metric occurs once per variant stream.

4. The method of claim 3, wherein the quality metric represents an average quality metric determined from a plurality of chunks.

5. The method of claim 1, wherein the tagging the quality metric occurs during encoding or chunking.

6. The method of claim 1, wherein the tagging the quality metric occurs after encoding or chunking.

7. The method of claim 1, wherein the computing a quality metric for each chunk comprising computing a quality metric for each frame of each chunk.

8. The method of claim 1, wherein the quality metric is selected from the group consisting of: peak signal to noise ratio (PSNR), structural similarity (SSIM), mean square error (MSE), mean sum of absolute differences (MSAD).

9. The method of claim 8, wherein the quality metric is PSNR.

10. The method of claim 9, wherein the computing the PSNR comprises using uncompressed video.

11. The method of claim 9, wherein computing the PSNR comprises using a highest bitrate variant.

12. The method of claim 1, wherein the syntax list comprises a playlist and the quality metric is provided as a field.

13. An adaptive bitrate streaming system comprising:

an encoder device configured to encode multiple streams of video data at variant bitrates, each bitrate stream having a plurality of chunks;

a content creation server configured to:

compute a quality metric for each chunk of each stream, wherein the quality metric is used in combination with at least one of the following parameters to select the variant bitrate: receiver bandwidth available to a client, display characteristics used by a client, and user feedback on quality at a client, and wherein the quality metric and said at least one of the following parameters are used by a machine learning module to select the variant bitrate; and tag the quality metric with each chunk of each stream, wherein the tag of the quality metric of each chunk is provided in a syntax list, wherein the tag of the quality metric is performed via content creation server based on user preferences learned from a client, and wherein the tag of the quality metric is performed via an encoder and re-encoding is not applied; and a client device in communication with the content creation server and configured to select a variant bitrate based in part on the quality metric of the chunks in the stream.

14. The method of claim 1, wherein the adaptive bitrate video comprises HLS.

* * * * *